(12) United States Patent
Mukherjee et al.

(10) Patent No.: US 12,536,991 B2
(45) Date of Patent: *Jan. 27, 2026

(54) SYSTEMS AND METHODS FOR CROWDSOURCED ACTIONS AND COMMANDS

(71) Applicant: Peloton Interactive, Inc., New York, NY (US)

(72) Inventors: Rajat Mukherjee, San Jose, CA (US); Kiran Bindhu Hemaraj, Trivandrum (IN)

(73) Assignee: Peloton Interactive, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/337,206

(22) Filed: Jun. 19, 2023

(65) Prior Publication Data

US 2023/0335115 A1    Oct. 19, 2023

Related U.S. Application Data

(63) Continuation of application No. 17/353,383, filed on Jun. 21, 2021, now Pat. No. 11,682,380, which is a
(Continued)

(51) Int. Cl.
*G10L 15/06* (2013.01)
*G06F 3/16* (2006.01)
*G10L 15/22* (2006.01)

(52) U.S. Cl.
CPC ............ *G10L 15/063* (2013.01); *G06F 3/167* (2013.01); *G10L 15/22* (2013.01); *G10L 2015/0635* (2013.01); *G10L 2015/223* (2013.01)

(58) Field of Classification Search
CPC . G10L 15/06; G10L 15/22; G10L 2015/0635; G10L 2015/223; G06F 3/167
(Continued)

(56) References Cited

U.S. PATENT DOCUMENTS

| 5,600,711 A | 2/1997 | Yuen |
| 6,173,266 B1 | 1/2001 | Marx et al. |

(Continued)

FOREIGN PATENT DOCUMENTS

| EP | 2386975 A2 | 11/2011 |
| EP | 2760015 A1 | 7/2014 |
| WO | 2016109366 A1 | 7/2016 |

OTHER PUBLICATIONS

Lee, R. and Nathuji, R., "Power and performance Analysis of PDA Architectures," pp. 11 (Dec. 12, 2000).
(Continued)

*Primary Examiner* — William D Titcomb
(74) *Attorney, Agent, or Firm* — AMPACC Law Group, PLLC

(57) ABSTRACT

Embodiments facilitate the intuitive creation, maintenance, and distribution of action datasets that include computing events or tasks that can be reproduced when a command is received by a digital assistant. The digital assistant can generate new action datasets, on-board new action datasets, and receive new action datasets or updates to existing action datasets locally or via a digital assistant server, among other things. The digital assistant server can also receive action datasets, maintain action datasets, and distribute action datasets to one or more digital assistants, among other things.

17 Claims, 6 Drawing Sheets

Related U.S. Application Data continuation of application No. 16/038,993, filed on Jul. 18, 2018, now Pat. No. 11,043,206, which is a continuation-in-part of application No. 15/984,122, filed on May 18, 2018, now Pat. No. 11,520,610.

(60) Provisional application No. 62/576,766, filed on Oct. 25, 2017, provisional application No. 62/508,181, filed on May 18, 2017.

(58) Field of Classification Search
USPC .......................................................... 715/727
See application file for complete search history.

(56) References Cited

U.S. PATENT DOCUMENTS

| | | | |
|---|---|---|---|
| 6,188,976 B1 | 2/2001 | Ramaswamy et al. | |
| 6,442,519 B1 | 8/2002 | Kanevsky et al. | |
| 6,535,912 B1 | 3/2003 | Anupam et al. | |
| 6,636,831 B1 | 10/2003 | Profit, Jr. et al. | |
| 6,678,864 B1 | 1/2004 | Tsai | |
| 7,024,348 B1 | 4/2006 | Scholz et al. | |
| 7,440,895 B1 | 10/2008 | Miller et al. | |
| 7,546,576 B2 | 6/2009 | Egli | |
| 7,627,638 B1 | 12/2009 | Cohen | |
| 7,729,919 B2 | 6/2010 | Wang | |
| 7,747,573 B2 | 6/2010 | Butt et al. | |
| 7,756,708 B2 | 7/2010 | Cohen et al. | |
| 8,160,883 B2 | 4/2012 | Lecoeuche | |
| 8,453,058 B1 | 5/2013 | Coccaro et al. | |
| 8,473,949 B2 | 6/2013 | Horvitz et al. | |
| 8,620,842 B1 | 12/2013 | Cormack | |
| 8,775,177 B1 | 7/2014 | Heigold et al. | |
| 8,805,766 B2 | 8/2014 | Ray | |
| 9,053,708 B2 | 6/2015 | Koch et al. | |
| 9,123,336 B1 | 9/2015 | Uszkoreit et al. | |
| 9,330,659 B2 | 5/2016 | Ju et al. | |
| 9,361,887 B1* | 6/2016 | Braga | H04W 4/21 |
| 9,384,732 B2 | 7/2016 | Bishop et al. | |
| 9,412,392 B2 | 8/2016 | Lindahl | |
| 9,472,192 B2 | 10/2016 | Ding | |
| 9,479,831 B2 | 10/2016 | Oostveen et al. | |
| 9,479,931 B2 | 10/2016 | Ortiz, Jr. et al. | |
| 9,508,339 B2 | 11/2016 | Kannan et al. | |
| 9,619,468 B2 | 4/2017 | Adams et al. | |
| 9,620,122 B2 | 4/2017 | Vanblon | |
| 9,754,585 B2* | 9/2017 | Brockett | G10L 15/22 |
| 10,007,500 B1* | 6/2018 | Suraci | G06F 9/50 |
| 10,176,171 B1 | 1/2019 | Patterson et al. | |
| 10,209,956 B2 | 2/2019 | Fletcher et al. | |
| 10,217,462 B2 | 2/2019 | Sarikaya et al. | |
| 10,332,513 B1 | 6/2019 | D'Souza et al. | |
| 10,402,470 B2* | 9/2019 | Esterly | G06F 3/0481 |
| 10,466,963 B2 | 11/2019 | Levi et al. | |
| 10,489,405 B2* | 11/2019 | Zheng | G06F 16/284 |
| 10,528,605 B2 | 1/2020 | Braga et al. | |
| 10,606,672 B2* | 3/2020 | Riva | H04L 67/53 |
| 10,698,654 B2 | 6/2020 | Loughrey et al. | |
| 12,073,147 B2* | 8/2024 | Carson | G06F 16/3344 |
| 2002/0032564 A1 | 3/2002 | Ehsani et al. | |
| 2003/0212561 A1 | 11/2003 | Williams et al. | |
| 2004/0236580 A1 | 11/2004 | Bennett | |
| 2005/0010418 A1 | 1/2005 | McNair et al. | |
| 2005/0010892 A1 | 1/2005 | McNair et al. | |
| 2005/0097618 A1 | 5/2005 | Arling et al. | |
| 2005/0135338 A1 | 6/2005 | Chiu et al. | |
| 2005/0240917 A1 | 10/2005 | Wu | |
| 2005/0261903 A1 | 11/2005 | Kawazoe et al. | |
| 2006/0294509 A1 | 12/2006 | Mital et al. | |
| 2007/0055492 A1 | 3/2007 | Wang et al. | |
| 2007/0271292 A1 | 11/2007 | Acharya et al. | |
| 2008/0021708 A1 | 1/2008 | Bennett et al. | |
| 2008/0120616 A1 | 5/2008 | James et al. | |
| 2008/0201140 A1 | 8/2008 | Wells et al. | |
| 2008/0221715 A1 | 9/2008 | Krzyzanowski et al. | |
| 2009/0070312 A1 | 3/2009 | Patterson | |
| 2009/0249206 A1 | 10/2009 | Stahlberg | |
| 2009/0307162 A1 | 12/2009 | Bui et al. | |
| 2010/0036676 A1 | 2/2010 | Safdi et al. | |
| 2010/0082398 A1 | 4/2010 | Davis et al. | |
| 2010/0088100 A1 | 4/2010 | Lindahl | |
| 2011/0066634 A1 | 3/2011 | Phillips et al. | |
| 2011/0301943 A1 | 12/2011 | Patch | |
| 2011/0320767 A1 | 12/2011 | Eren et al. | |
| 2012/0035932 A1 | 2/2012 | Jitkoff et al. | |
| 2012/0066600 A1 | 3/2012 | Nickel | |
| 2012/0209613 A1 | 8/2012 | Agapi et al. | |
| 2013/0013644 A1 | 1/2013 | Sathish et al. | |
| 2013/0080177 A1 | 3/2013 | Chen | |
| 2013/0152092 A1 | 6/2013 | Yadgar | |
| 2013/0179423 A1 | 7/2013 | Gur et al. | |
| 2013/0329086 A1 | 12/2013 | Malone | |
| 2014/0074481 A1 | 3/2014 | Newman | |
| 2014/0074483 A1 | 3/2014 | van Os | |
| 2014/0108013 A1 | 4/2014 | Di Cristo et al. | |
| 2014/0108308 A1* | 4/2014 | Stout | G06Q 30/0241 706/20 |
| 2014/0115456 A1 | 4/2014 | White et al. | |
| 2014/0136187 A1 | 5/2014 | Wolverton et al. | |
| 2014/0222436 A1 | 8/2014 | Binder | |
| 2014/0278413 A1 | 9/2014 | El et al. | |
| 2014/0280238 A1 | 9/2014 | Gormack et al. | |
| 2014/0282003 A1 | 9/2014 | Gruber et al. | |
| 2014/0297282 A1 | 10/2014 | Peters et al. | |
| 2015/0006178 A1 | 1/2015 | Peng et al. | |
| 2015/0032451 A1 | 1/2015 | Gunn et al. | |
| 2015/0045003 A1 | 2/2015 | Vora et al. | |
| 2015/0089373 A1 | 3/2015 | Dwivedi et al. | |
| 2015/0095031 A1 | 4/2015 | Conkie et al. | |
| 2015/0120723 A1 | 4/2015 | Deshmukh et al. | |
| 2015/0180967 A1 | 6/2015 | Takagishi | |
| 2015/0242385 A1 | 8/2015 | Bao et al. | |
| 2015/0248730 A1 | 9/2015 | Pilot et al. | |
| 2015/0302850 A1 | 10/2015 | Lebrun | |
| 2015/0317310 A1 | 11/2015 | Glass et al. | |
| 2015/0348551 A1 | 12/2015 | Gruber et al. | |
| 2015/0355609 A1* | 12/2015 | Warren | G06Q 50/01 700/275 |
| 2015/0371628 A1 | 12/2015 | Kreifeldt | |
| 2015/0373183 A1 | 12/2015 | Woolsey et al. | |
| 2016/0004974 A1 | 1/2016 | Pope | |
| 2016/0019266 A1 | 1/2016 | Katsunuma et al. | |
| 2016/0072940 A1* | 3/2016 | Cronin | H04W 4/70 455/414.1 |
| 2016/0077853 A1 | 3/2016 | Feng et al. | |
| 2016/0132568 A1 | 5/2016 | Vogel et al. | |
| 2016/0155442 A1* | 6/2016 | Kannan | G06F 3/167 704/275 |
| 2016/0162456 A1 | 6/2016 | Munro et al. | |
| 2016/0162478 A1* | 6/2016 | Blassin | G06Q 10/063112 706/12 |
| 2016/0179897 A1* | 6/2016 | Zheng | G06F 16/289 707/722 |
| 2016/0225371 A1 | 8/2016 | Igrawal et al. | |
| 2016/0259623 A1 | 9/2016 | Sumner et al. | |
| 2016/0260430 A1 | 9/2016 | Panemangalore et al. | |
| 2016/0275949 A1 | 9/2016 | Bishop et al. | |
| 2016/0358603 A1 | 12/2016 | Azam et al. | |
| 2016/0378279 A1 | 12/2016 | Sirpal et al. | |
| 2016/0378325 A1 | 12/2016 | Hurley et al. | |
| 2016/0378439 A1 | 12/2016 | Straub et al. | |
| 2017/0011739 A1 | 1/2017 | Huang | |
| 2017/0069177 A1 | 3/2017 | Takahata et al. | |
| 2017/0093781 A1 | 3/2017 | Sharma et al. | |
| 2017/0116982 A1 | 4/2017 | Gelfenbeyn et al. | |
| 2017/0132199 A1 | 5/2017 | Vescovi et al. | |
| 2017/0193123 A1 | 7/2017 | Jones et al. | |
| 2017/0220240 A1 | 8/2017 | Kataria et al. | |
| 2017/0289172 A1 | 10/2017 | Turakhia | |
| 2018/0174577 A1 | 6/2018 | Jothilingam et al. | |
| 2018/0308476 A1 | 10/2018 | Hirzel et al. | |
| 2018/0336049 A1* | 11/2018 | Mukherjee | G06F 8/61 |
| 2018/0336050 A1* | 11/2018 | Mukherjee | G06F 3/167 |
| 2018/0336269 A1 | 11/2018 | Dobrynin et al. | |

(56) References Cited

U.S. PATENT DOCUMENTS

| | | | |
|---|---|---|---|
| 2018/0350353 A1 | 12/2018 | Gruber et al. | |
| 2018/0366108 A1 | 12/2018 | Mukherjee et al. | |
| 2018/0366113 A1 | 12/2018 | Hemaraj et al. | |
| 2019/0130244 A1* | 5/2019 | Mars | G06N 20/20 |
| 2019/0132436 A1 | 5/2019 | Jang et al. | |
| 2019/0208130 A1 | 7/2019 | Hara et al. | |
| 2019/0287512 A1 | 9/2019 | Zoller et al. | |
| 2019/0347118 A1 | 11/2019 | Mukherjee et al. | |
| 2023/0335115 A1* | 10/2023 | Mukherjee | G06F 3/167 |

OTHER PUBLICATIONS

Notice of Allowance dated Oct. 5, 2021, in U.S. Appl. No. 15/936,001, 17 pages.

Final Office Action dated Nov. 3, 2021, in U.S. Appl. No. 16/110,108, 19 pages.

"The Q System", Aiqudo, p. 1.

"The Q App & Action Kil", Aiqudo, pp. 5.

"Q Commands", Aiqudo, pp. 4.

"Hash table", Wikipedia, Retrieved from Internet URL : https://en.wikipedia.org/w/index.php?ille=Hash_lable&oldid=753684620, accessed on Sep. 28, 2021, pp. 18 (Dec. 8, 2016).

Mechling, L. C., et al., "Using a Personal Digital Assistant to Increase Independent Task Completion by Students , with Autism Spectrum Disorder", J Autism Dev Disord, pp. 1420-1434 {May 23, 2009).

Non Final Office Action dated Jul. 12, 2021 in U.S. Appl. No. 16/110,103, 20 pages.

Extended European Search Report and Opinion received for EP Patent Application No. 18801977.2, mailed on Jul. 22, 2021, 17 pages.

Non Final Office Action dated Sep. 2, 2021 in U.S. Appl. No. 15/984,122, 20 pages.

Extended European Search Report and Opinion received for EP Patent Application No. 19748228.4, mailed on Sep. 24, 2021, 11 pages.

* cited by examiner

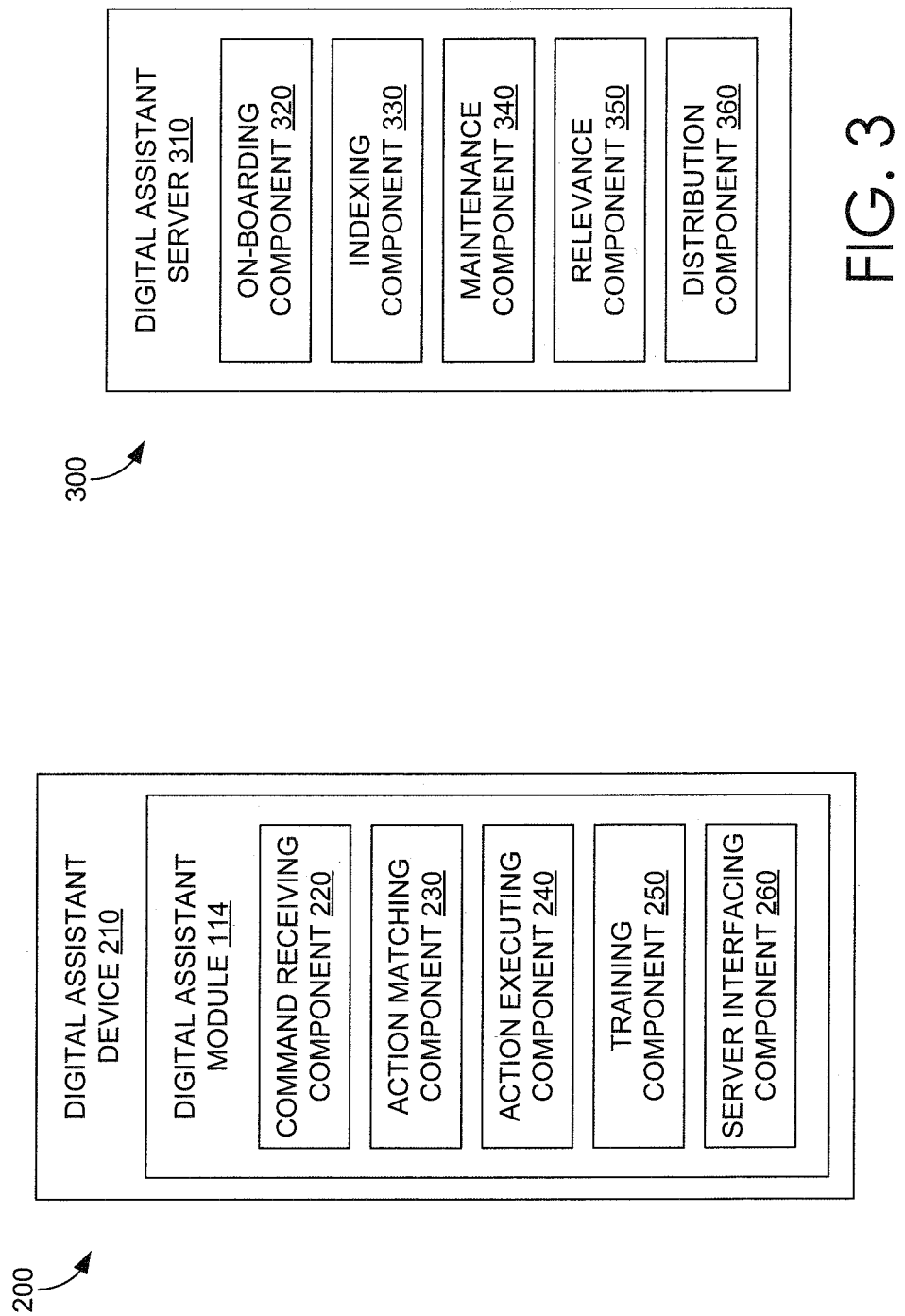

SYSTEMS AND METHODS FOR CROWDSOURCED ACTIONS AND COMMANDS

CROSS-REFERENCE TO RELATED APPLICATIONS

This application is a continuation of U.S. patent application Ser. No. 17/353,383 filed Jun. 21, 2021, now U.S. Pat. No. 11,682,380, which is a continuation of U.S. patent application Ser. No. 16/038,993, now U.S. Pat. No. 11,043,206, which is a continuation-in-part of U.S. patent application Ser. No. 15/984,122, filed May 18, 2018, now U.S. Pat. No. 11,520,610, which claims the benefit of U.S. Provisional Patent Application No. 62/508,181, filed May 18, 2017. This application also claims the benefit of U.S. Provisional Patent Application No. 62/576,766, filed Oct. 25, 2017. Each of the foregoing applications are assigned or under obligation of assignment to the same entity as this application, the entire contents of each being herein incorporated by reference.

BACKGROUND

Digital assistants have become ubiquitously integrated into a variety of consumer electronic devices. Modern day digital assistants employ speech recognition technologies to provide a conversational interface between users and electronic devices. These digital assistants can employ various algorithms, such as natural language processing, to improve interpretations of commands received from a user. Consumers have expressed various frustrations with conventional digital assistants due to privacy concerns, constant misinterpretations of spoken commands, unavailability of services due to weak signals or a lack of signal, and the general requirement that the consumer must structure their spoken command in a dialect that is uncomfortable for them.

SUMMARY

This summary is provided to introduce a selection of concepts in a simplified form that am further described below in the detailed description. This summary is not intended to identify key features or essential features of the claimed subject matter, nor is it intended to be used in isolation as an aid in determining the scope of the claimed subject matter.

Embodiments described in the present disclosure are generally directed towards systems and methods relating to a crowd-sourced digital assistant for computing devices. In particular, embodiments facilitate the intuitive creation and distribution of action datasets that include reproducible computing events and associated commands that can be employed to invoke a reproduction of the computing events on computing devices having the crowd-sourced digital assistant installed and/or executing thereon. The described embodiments describe a digital assistant system and application that can perform any operation on a computing device by way of a received command, the operations being limited only by the various operations executable on the computing device.

In accordance with embodiments described herein, the described digital assistant and corresponding system provides an ever-growing and evolving library of dialects that enables the digital assistant to learn from its users, in contrast to the frustrating and limited interpretation features provided by conventional digital assistants. Further, because the digital assistant and corresponding system is configured with a framework for distributing improvements to its collection of actionable operations and understandable commands, and because the digital assistant utilizes applications existing on the computing device of each user, privacy concerns typically associated with conventional digital assistants is significantly reduced.

BRIEF DESCRIPTION OF THE DRAWINGS

The present invention is described in detail below with reference to the attached drawing figures, wherein:

FIG. 2 is a block diagram of an exemplary digital assistant device, in accordance with an embodiment of the present disclosure;

FIG. 3 is a block diagram of an exemplary digital assistant server, in accordance with an embodiment of the present disclosure;

DETAILED DESCRIPTION

Figure 1:
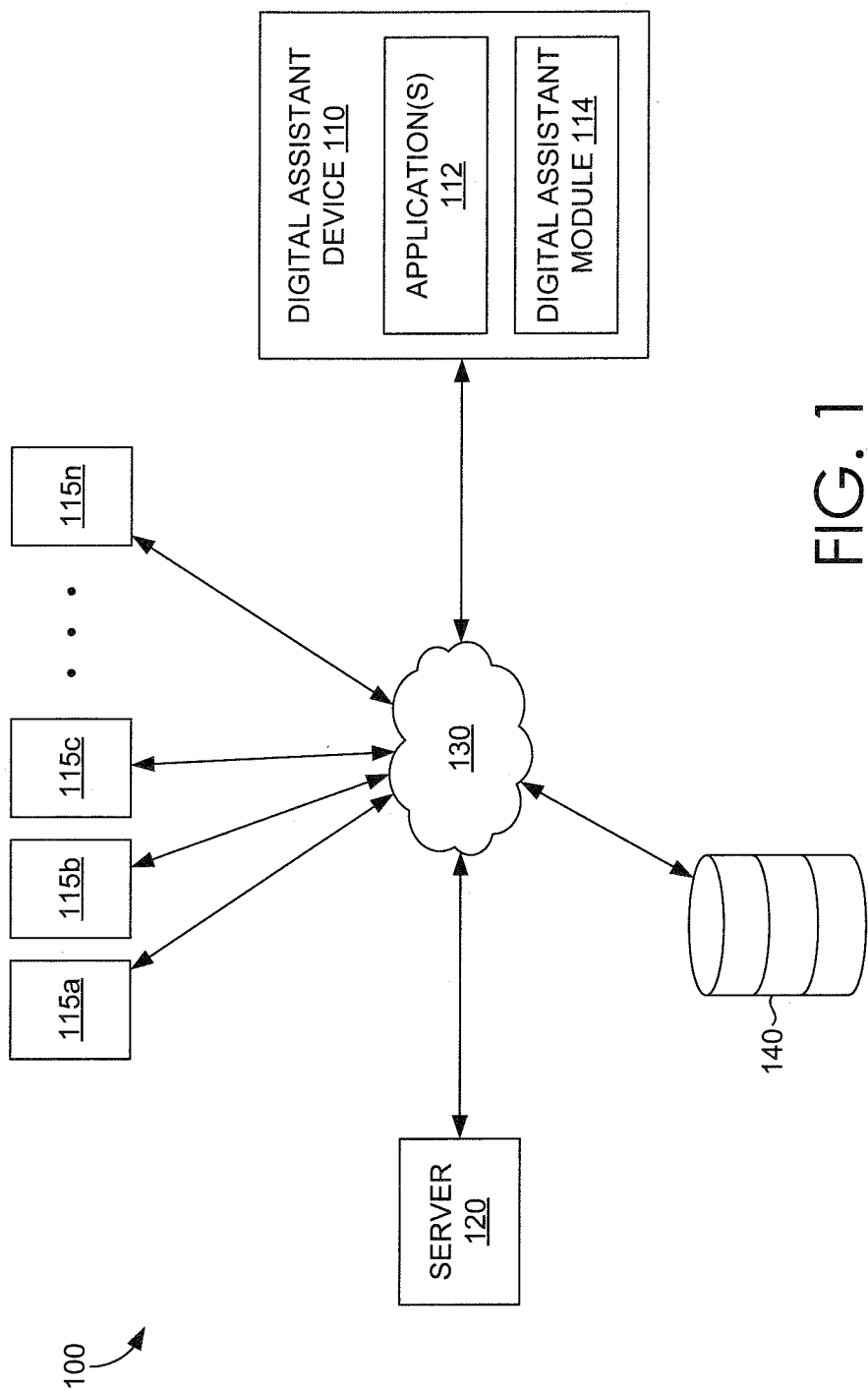
FIG. 1 is a block diagram of an exemplary computing environment for a crowd-sourced digital assistant system, in accordance with embodiments of the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Aspects of the technology described herein are generally directed towards systems and methods for crowdsourcing actionable operations of a digital assistant. The described embodiments facilitate the creation, on-boarding, and distribution of action datasets to any number of computing devices having an instance of the digital assistant installed and/or executing thereon (hereinafter referenced as a "digital assistant device"). In accordance with the present disclosure, an "operation" can correspond to a final result, output, or computing operation that is generated, executed, or performed by a digital assistant device based on one or more action datasets selected and interpreted for execution by the digital assistant device, each action dataset being comprised of one or more reproducible computing events that can be invoked in response to a received command determined to correspond to the action dataset. In accordance with embodiments described herein, an "action" is described in reference to an operation that is performed in response to an action dataset selected and interpreted for execution. In this regard, an action can be performed, invoked, initiated, or executed, among other things, and any reference to the foregoing can imply that a corresponding action dataset is selected and interpreted for execution by the digital assistant device to perform the corresponding operation.

In some embodiments, actions (or the action datasets corresponding thereto) can be created, by the digital assistant device, which can record a series of detected events (e.g., inputs) that are typically provided by a user of the digital assistant device when manually invoking the desired operation (e.g., with manual inputs via a touchscreen or other input method of the digital assistant device). That is, to create a new action dataset, the digital assistant device can invoke a recording mode where a user can simply perform a series of computing operations (e.g., manual touches, click inputs) within one or more applications to achieve a desired result or operation. After the recording is stopped by the user, via a terminating input, the action dataset can store and be associated with a set of command templates corresponding to commands that the user would preferably announce to the digital assistant device when an invocation of the operation is desired. In various embodiments, a command representation can be received as speech data and convened to text (e.g., by a speech engine of the digital assistant device), or received as text input data. In accordance with embodiments described herein, a "command" is referenced herein to describe data, received as speech data or as text data. A "command representation." on the other hand is referenced to describe text data that is received, based on inputs (e.g., keyboard), received speech data converted to text data, or received text data communicated from another computing device. A "command template" is referenced herein to describe a portion of a command representation having defined parameter fields in place of variable terms.

In more detail, one or more terms or keywords in the received command can be defined as a parameter based on input(s) received from the user. A parameter, in accordance with the present disclosure, can be referenced as corresponding to one of a plurality of predefined parameter types, such as but not limited to, genre, artist, title, location, name or contact, phone number, address, city, state, country, day, week, month, year, and more. It is also contemplated that the digital assistant device can access from a memory, or retrieve (e.g., from a server), a set of predefined parameter types that are known or determined to correspond to the application or applications for which an action dataset is being created. In some embodiments, the set of predefined parameter types can be determined based at least in part on corresponding application identifying information. The digital assistant device can extract, based on the defined parameters, the corresponding keywords and generate a command template based on the remaining terms and the defined parameters. By way of example only, if the command was originally received as "play music by Coldplay," and the term "Coldplay" is defined as a parameter of type "artist." a resulting command template generated by the digital assistant device may appear as "play music by <artist>". In this regard, a command template may include the originally received command terms if no parameters are defined, or may include a portion of the originally received command terms with parameter fields defined therein, the defined parameters corresponding to variable terms of a command.

The digital assistant device can receive, among other things, application identifying information, a recorded series of events, and a set command templates, among other things, to generate a new action dataset that can be retrieved, interpreted and/or invoked by the digital assistant device, simply based on a determination, by the digital assistant device, that a received command or command representation is associated with the action dataset. When an action is invoked based on a determination that a received command or command representation corresponds to an action dataset, the digital assistant device can reproduce (e.g., emulate, invoke, execute, perform) the recorded series of events associated with the corresponding action dataset, thereby performing the desired operation. Moreover, in circumstances where a received command or command representation includes a parameter term, and a determination is made that the received command or command representation corresponds to an action dataset having a parameter field that also corresponds to the parameter term, the parameter term can be employed, by the digital assistant device, to perform custom operations while performing the action. For instance, the digital assistant device can input the parameter term as a text input into a field of the application.

In some further embodiments, an action dataset, once created by the digital assistant device, can be uploaded (hereinafter also referenced as "on-boarded") to a remote server for storage thereby. The action dataset can be on-boarded automatically upon its generation or on-boarded manually based on a received instruction, by the digital assistant device. It is contemplated that individuals may want to keep their actions or command templates private, and so an option to keep an action dataset limited to locally-storage may be provided to the user (e.g., via a GUI element). The server, upon receiving an on-boarded action dataset, can analyze the action dataset and generate an associated action signature based on the characteristics and/or contents of the action dataset. Contents of an action dataset can include, among other things, application identifying information, corresponding command templates and parameters, and a recorded series of events. The action signature can be generated by various operations, such as hashing the on-boarded action dataset with a hashing algorithm, by way of example. It is also contemplated that the action signature can be generated by the on-boarding digital assistant device, the generated action signature then being stored in or appended to the action dataset before it is uploaded to the server.

In one aspect, the server can determine that the on-boarded action dataset already exists on the server, based on a determination that the action signature corresponds to the action signature of another action dataset already stored on the server. The server can either dispose of the on-boarded action dataset or merge the on-boarded action dataset (or determined differing portion(s) thereof) with an existing action dataset stored thereby, preventing redundancy and saving storage space. In another aspect, the server can analyze the on-boarded action dataset to determine if its contents (e.g., the recorded events, command templates, metadata) comply with one or more defined policies (e.g., inappropriate language, misdirected operations, incomplete actions) associated with general usage of the digital assistant system. In another aspect, the server can employ machine learning algorithms, among other things, to perform a variety of tasks, such as determining relevant parameter types, generating additional command templates for association with an on-boarded or stored action dataset, comparing similarity of events between on-boarded action datasets to identify and select more efficient routes for invoking an operation, and more.

In some further embodiments, the server can distribute one or more stored actions datasets to a plurality of digital assistant devices in communication with the server. In this way, each digital assistant device can receive action datasets or portions thereof (e.g., command templates) from the server. The action datasets can be distributed to the digital assistant devices in a variety of ways. For instance, in an embodiment, the server can freely distribute any or all determined relevant action datasets to digital assistant devices. In an embodiment, an application profile including a list of applications installed on a digital assistant device can be communicated to the server. Based on the application profile for the digital assistant device, the server can distribute any or all determined relevant action datasets to the digital assistant device. As digital assistant devices can include a variety of operating systems, and versions of applications installed thereon can also vary, it is contemplated that the application profile communicated by a digital assistant device to the server may include operating system and application version information, among other things, so that appropriate and relevant action datasets are identified by the server for distribution to the digital assistant device. For a more granular implementation, an action dataset profile including a list of action datasets or action signatures stored on the digital assistant device can be communicated to the server. In this way, only missing or updated action datasets can be distributed to the digital assistant device.

In some embodiments, a user can simply announce a command to the digital assistant device, and if a corresponding action dataset is not stored on the digital assistant device, the digital assistant device can send the command (representation) to the server for determination and selection of a set of relevant action datasets, which can then be communicated to the digital assistant device. Provided that the digital assistant device has the corresponding application installed thereon, the digital assistant device can retrieve, from the server, a set of determined most relevant action datasets, without additional configuration or interaction by the user, also reducing server load and saving bandwidth by inhibiting extraneous transfer of irrelevant action datasets. A retrieved set of relevant action datasets can be received from the server for invocation by the digital assistant device. It is further contemplated that if two or more action datasets are determined equally relevant to a received command, each action dataset may be retrieved from the server, and the digital assistant device can provide for display a listing of the determined relevant action datasets for selection and execution.

In some further embodiments, a user of a digital assistant device can customize command templates associated with an action dataset corresponding to an application installed on their digital assistant device. Put simply, a user can employ the digital assistant (or a GUI thereof) to select an action dataset from a list of action datasets stored on the computing device, select an option to add a new command to the action dataset, and define a new command and any associated parameters for storage in the action dataset. In this regard, the user can add any custom command and parameter that can later be understood by the digital assistant device to invoke the action. In some aspects, the custom command and/or modified action can be on-boarded to the server for analysis and storage, as noted above. In some further aspects, based on the analysis, the server can distribute the custom command and/or at least a portion of the modified action dataset to a plurality of other digital assistant devices. In this regard, the list of understandable commands and corresponding actions can continue to grow and evolve, and be automatically provided to any other digital assistant device.

Accordingly, at a high level and with reference to FIG. 1, an example operating environment 100 in which some embodiments of the present disclosure may be employed is depicted. It should be understood that this and other arrangements and/or features described by the enclosed document are set forth only as examples. Other arrangements and elements (e.g., machines, interfaces, functions, orders, and groupings of functions, etc.) or features can be used in addition to or instead of those described, and some elements or features may be omitted altogether for the sake of clarity. Further, many of the elements or features described in the enclosed document may be implemented in one or more components, or as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory.

The system in FIG. 1 includes one or more digital assistant devices 110, 115a. 115b, 115c . . . 115n, in communication with a server 120 via a network 130 (e.g., the Internet). In this example, the server 120, also in communication with the network 130, is in communication with each of the digital assistant devices 110, 115a-115n, and can also be in communication with a database 140. The database 140 can be directly coupled to the server 120 or coupled to the server 120 via the network 130. The digital assistant device 110, representative of other digital assistant devices 115a-115n, is a computing device comprising one or more applications 112 and a digital assistant module 114 installed and/or executing thereon.

The one or more applications 112 includes any application that is executable on the digital assistant device 110, and can include applications installed via an application marketplace, custom applications, web applications, side-loaded applications, applications included in the operating system of the digital assistant device 110, or any other application that can be reasonably considered to fit the general definition of an application or mobile application. On the other hand, the digital assistant module 114 can provide digital assistant services installed on the digital assistant device 110 or provided by the server 120 via the network 130, or can be implemented at least partially into an operating system of the digital assistant device 110. In accordance with embodiments described herein, the digital assistant module 114 provides an interface between a digital assistant device 110 and an associated user (not shown), generally via a speech-based exchanged, although any other method of exchange between user and digital assistant device 110 (e.g., keyboard input, communication from another digital assistant device or computing device) remains within the purview of the present disclosure.

When voice commands are received by the digital assistant device 110, the digital assistant module 114 can convert the speech command to text utilizing a speech-to-text engine (not shown) to extract identified terms and generate a command representation. The digital assistant module 114 can receive the command representation, and determine that the command representation corresponds to at least one command template of at least one action dataset stored on the digital assistant device. In some embodiments, the digital assistant module can generate an index of all command templates stored on the digital assistant device 110 for faster searching and comparison of the received command representation to identify a corresponding command template, and thereby a corresponding action dataset. Each indexed command template can be mapped to a corresponding action dataset, which can be interpreted for execution in response to a determination of a confirmed match with the received command representation.

By way of brief overview, a command template can include one or more keywords and/or one or more parameters that each have a corresponding parameter type. Each command template generally corresponds to an operation that can be performed on one or more applications 112 installed on a digital assistant device 110. Moreover, a plurality of command templates can correspond to a single operation, such that there are multiple equivalent commands that can invoke the same operation. By way of example only, commands such as "check in," check into flight," "please check in," "check into flight now," "check in to flight 12345," and the like, can all invoke the same operation that, by way of example only, directs the digital assistant module 114 to execute an appropriate airline application on the digital assistant device 110 and perform a predefined set of events or computer operations to achieve the same result.

The aforementioned commands, however, may lack appropriate information (e.g., the specific airline). As one of ordinary skill may appreciate, a user may have multiple applications 112 from various vendors (e.g., airlines) associated with a similar service (e.g., checking into flights). A digital assistant device 110 in accordance with embodiments described herein can provide features that can determine contextual information associated with the digital assistant device 110, or its associated user, based on historical use of the digital assistant device 110, profile information stored on the digital assistant device 110 or server 120, stored parameters from previous interactions or received commands, indexed messages (e.g., email, text messages) stored on the digital assistant device, and a variety of other types of data stored locally or remotely on a server, such as server 120, to identify a most relevant parameter and supplement a command to select a most relevant action dataset. More specific commands, such as "check into FriendlyAirline flight," or "FriendlyAirline check in," and the like, where a parameter is specifically defined in the command, can be recognized by the digital assistant module 114.

One or more recognizable commands and corresponding action datasets can be received by the digital assistant device 110 from the server 120 at any time, including upon installation, initialization, or invocation of the digital assistant module 114, after or upon receipt of a speech command by the digital assistant module 114, after or upon installation of a new application 112, periodically (e.g., once a day), when pushed to the digital assistant device 110 from the server 120, among many other configurations. It is contemplated that the action datasets received by the digital assistant device 110 from the server 120 can be limited based at least in part on the applications 112 installed on the digital assistant device 110, although configurations where a larger or smaller set of action datasets received are contemplated.

In the event an action dataset is determined not available for a particular application 112 installed on the digital assistant device 110, digital assistant module 114 can either redirect the user to a marketplace (e.g., launch an app marketplace application) to install the appropriate application determined by the server 120 based on the received command, or can invoke an action training program that prompts a user to manually perform tasks on one or more applications to achieve the desired result, the tasks being recorded and stored into a new action dataset by the digital assistant device 110. The digital assistant module 114 can also receive one or more commands from the user (e.g., via speech or text) to associate with the action dataset being generated. If the command includes variable parameters (e.g., optional fields), the action training program can facilitate a definition of such parameters and corresponding parameter types to generate command templates for inclusion in the action dataset being generated. In this way, a command template(s) is associated with at least the particular application designated by the user and also corresponds to the one or more tasks manually performed by the user, associating the generated command template to the task(s) and thus the desired resulting operation.

In some instances, the server 120 can provide a determined most-relevant action dataset to the digital assistant device 110 based on the received command. The server 120 can store and index a constantly-growing and evolving plurality of crowd-sourced action datasets submitted by or received from digital assistant devices 115a-115n also independently having a digital assistant module 114 and any number of applications 112 installed thereon. The digital assistant devices 115a-115n may have any combination of applications 112 installed thereon, and any generation of action datasets performed on any digital assistant device 110, 115-115n can be communicated to the server 120 to be stored and indexed for mass or selective deployment, among other things. In some aspects, the server 120 can include various machine-learned algorithms to provide a level of quality assurance on command templates included in on-boarded action datasets and/or the tasks and operations performed before they are distributed to other digital assistant devices via the network 130.

When the digital assistant module 114 determines an appropriate action dataset (e.g., one or more tasks to achieve a desired result) having one or more command templates that corresponds to the received command, the digital assistant module 114 can generate an overlay interface that can mask any or all visual outputs associated with the determined action or the computing device generally. The generation of the overlay interface can include a selection, by the digital assistant module 114, of one or more user interface elements that are stored in a memory of the digital assistant device 110 or server 120, and/or include a dynamic generation of the user interface element(s) by the digital assistant module. 114 or server 120 based on one or more portions of the received command and/or obtained contextual data (e.g., determined location data, user profile associated with the digital assistant device 110 or digital assistant module 114, historical data associated with the user profile, etc.) obtained by the digital assistant device 110, digital assistant module 114, and/or server 120. The selected or generated one or more user interface elements can each include content that is relevant to one or more portions (e.g., terms, keywords) of the received command. In the event of dynamic generation of user interface elements, such elements can be saved locally on the digital assistant device 110 or remotely on the server 120 for subsequent retrieval by the digital assistant device 110, or can be discarded and dynamically regenerated at any time.

Example operating environment depicted in FIG. 1 is suitable for use in implementing embodiments of the invention. Generally, environment 100 is suitable for creating, on-boarding, storing, indexing, crowd-sourcing (e.g., distributing), and invoking actions or action datasets, among other things. Environment 100 includes digital assistant device 110, action cloud server 120 (hereinafter also referenced as "server") and network 130. Digital assistant device 110 can be any kind of computing device having a digital assistant module installed and/or executing thereon, the digital assistant module being implemented in accordance with at least some of the described embodiments. For example, in an embodiment, digital assistant device 110 can be a computing device such as computing device 800, as described below with reference to FIG. 7. In embodiments, digital assistant device 110 can be a personal computer (PC), a laptop computer, a workstation, a mobile computing device, a PDA, a cell phone, a smart watch or wearable, or the like. Any digital assistant device described in accordance with the present disclosure can include features described with respect to the digital assistant device 110. In this regard, a digital assistant device can include one or more applications 112 installed and executable thereon. The one or more applications 112 includes any application that is executable on the digital assistant device, and can include applications installed via an application marketplace, custom applications, web applications, side-loaded applications, applications included in the operating system of the digital assistant device, or any other application that can be reasonably considered to fit the general definition of an application. On the other hand, the digital assistant module can be an application, a service accessible via an application installed on the digital assistant device or via the network 130, or implemented into a layer of an operating system of the digital assistant device 110. In accordance with embodiments described herein, the digital assistant module 114 can provide an interface between a digital assistant device 110 and a user (not shown), generally via a speech-based exchange, although any other method of exchange between user and digital assistant device may be considered within the purview of the present disclosure.

Similarly, action cloud server 120 ("server") can be any kind of computing device capable of facilitating the onboarding, storage, management, and distribution of crowdsourced action datasets. For example, in an embodiment, action cloud server 120 can be a computing device such as computing device 700, as described below with reference to FIG. 7. In some embodiments, action cloud server 120 comprises one or more server computers, whether distributed or otherwise. Generally, any of the components of environment 100 may communicate with each other via a network 130, which may include, without limitation, one or more local area networks (LANs) and/or wide area networks (WANs). Such networking environments are commonplace in offices, enterprise-wide computer networks, intranets, and the Internet. The server 120 can include or be in communication with a data source 140, which may comprise data sources and/or data systems, configured to make data available to any of the various constituents of the operating environment 100. Data sources 140 may be discrete from the illustrated components, or any combination thereof, or may be incorporated and/or integrated into at least one of those components.

Referring now to FIG. 2, a block diagram 200 of an exemplary digital assistant device 210 suitable for use in implementing embodiments of the invention is shown. Generally, digital assistant device 210 (also depicted as digital assistant device 110 of FIG. 1) is suitable for receiving commands or command representations, selecting action datasets to execute by matching received commands to command templates of action datasets, or determining that no action datasets correspond to received commands, interpreting a selected action dataset to execute the associated operation, generating new action datasets, and sending action datasets to or receiving action datasets from a digital assistant server, such as server 120.

Digital assistant device 210 can include, among other things, a command receiving component 220, an action matching component 230, an action executing component 240, a training component 250, and a server interfacing component 260. The command receiving component 220 can receive a command, either in the form of speech data or text data. The speech data can be received via a microphone of the digital assistant device 210, or another computing device paired to or in communication with the digital assistant device 210. The command receiving component 220, after receiving the speech data, can employ a speech-to-text engine of the digital assistant device 210 to generate a command representation (e.g., a text string of the command). Text data received by command receiving component 220, on the other hand, can be received via a virtual keyboard or other input method of the digital assistant device 210, and similarly, can be received from another computing device paired to or in communication with the digital assistant device 210. Received text data is already in the form of a command representation, and is treated as such. In various embodiments, command receiving component 210 can be invoked manually by a user (e.g., via an input to begin listening for or receiving the command), or can be in an always-listening mode.

Based on a command representation being received, action matching component 230 can determine whether one or more action datasets stored on the digital assistant device 210 include a command template that corresponds to or substantially corresponds (e.g., at least 90% similar) to the received command representation. In some aspects, a corresponding command template can be identified, and the action dataset of which the corresponding command template is stored in is selected for interpretation by action executing component 240. In some other aspects, a corresponding command template cannot be identified, and either the training component 250 can be invoked, or the received command is communicated to the digital assistant server (depicted as server 120 of FIG. 1 and digital assistant server 310 of FIG. 3) via the server interfacing component 260.

The action executing component 240 can receive a selected action dataset, either selected by digital assistant device 210 from local storage, by the digital assistant server from storage accessible thereto, or selected from a list presented by digital assistant device 210. The action executing component 240 can, from the received action dataset, interpret event data, which may include executable code, links, deep links, references to GUI elements, references to screen coordinates, field names, or other pieces of data that can correspond to one or more tasks or events stored in the selected action dataset. When the event data is interpreted, the action executing component 240 can reproduce the events that were recorded when the action dataset was initially generated, by any digital assistant device such as digital assistant device 210. In some aspects, the event data can include time delays, URLs, deep links to application operations, or any other operation that can be accessed, processed, emulated, or executed by the action executing component 240. In some aspects, events like click or touch inputs, can be reproduced on the digital assistant device 210, based on the interpreted event data stored in an action dataset.

The training component 250 can facilitate the generation of an action dataset, among other things. When the training component 250 is invoked, an indication, such as a GUI element, indicating that an action recording session has begun may be presented for display. A prompt to provide the tasks or events required to perform the desired operation can also be presented for display. In this regard, a user can begin by first launching an application for which the operation is associated with, and proceed with providing inputs to the application (i.e., (performing the requisite tasks). The inputs can be recorded by the digital assistant device 210, and the training component 250 can listen for, parse, identify, and record a variety of attributes of the received inputs, such as long or short presses, time delays between inputs, references to GUI elements interacted with, field identifiers, application links activated based on received inputs (e.g., deep links), and the like. The recorded inputs and attributes (e.g., event data) can be stored, sequentially, in an event sequence, and stored into a new action dataset. The application launched is also identified, and any application identifying information, such as operating system, operating system version, application version, paid or free version status, and more, can be determined from associated metadata and also stored into the new action dataset. When the desired operation is completed (i.e., all requisite tasks/events performed), a user can activate a training termination button, which can be presented as a floating button or other input mechanism that is preferably positioned away from an active portion of the display. Other termination methods are also contemplated, such as voice activated termination, or motion activated termination, without limitation.

The training component 250 can further request that the user provide a set of commands that correspond to the desired operation. A command can be received via speech data and converted to a command representation by a speech to text engine, or received via text input as a command representation, among other ways. When the set of commands is provided and stored as command representations, the training component 250 can further prompt the user to define any relevant parameters or variables in the command representations, which can correspond to keywords or values that may change whenever the command is spoken. In this regard, a user may select one or more terms included in the received command representations, and define them with a corresponding parameter type selected from a list of custom, predefined, or determined parameter times, as described herein. The training component 250 can then extract the selected one or more terms from a command representation defined as parameter(s), replacing them with parameter field identifier(s) of a corresponding parameter type, and store the resulting data as a command template. The training component 250 can then generate the action dataset from the recorded event sequence, the application identifying information, and the one or more defined command templates. In some embodiments, the training component 250 can generate an action signature or unique hash based on the generated action dataset or one or more portions of data included therein. The action signature can be employed by the digital assistant server to determine whether the action dataset or data included therein is redundant, among other things.

Looking now to MG. 3, a block diagram 300 of an exemplary digital assistant server 310 suitable for use in implementing embodiments of the invention is shown. Generally, digital assistant server 310 (also depicted as server 120 of FIG. 1) is suitable for establishing connections with digital assistant device(s) 210, receiving generated action datasets, maintaining or indexing received action datasets, receiving commands or command representations to determine one or more most relevant action datasets for selection and communication to a sending digital assistant device of the command or command representation, and distributing action datasets to other digital assistant devices, such as digital assistant device 210. Digital assistant server 310 can include, among other things, an on-boarding component 320, an indexing component 330, a maintenance component 340, a relevant component 350, and a distribution component 360, among other things.

The on-boarding component 320 can receive action datasets generated by one or more digital assistant devices 210 in communication therewith. In some aspects, the on-boarding component can generate an action signature for a received action dataset, similar to how a digital assistant device may, as described herein above. Before storing the received action dataset, the action signature can be searched utilizing the indexing component 330, which maintains an index of all action datasets stored by the digital assistant server 310. The indexing component 330 facilitates quick determination of uniqueness of received action datasets, and reduces redundancy and processing load of the digital assistant server 310.

On a similar note, the maintenance component 340 can determine whether any portion of a received action dataset is different than action datasets already stored on or by the server (e.g., in a database), and extract such portions for merging into the existing corresponding action datasets. Such portions may be identified in circumstances where only command templates am hashed in the action signature, or where each portion of the action dataset (e.g., application identifying information, command template(s) event sequence) is independently hashed either by training component 240 of FIG. 2 or on-boarding component 310 of FIG. 3, to more easily identify changes or differences between action datasets. By way of example, in some embodiments, a received action dataset can include separate hashes for its application identifying information, event sequence, and command template(s). In this regard, the digital assistant server 310 can employ the indexing component 330 and maintenance component 340 to quickly identify, for instance, that the received action data corresponds to a particular application and operation, or that the command template(s) are different than those stored in the stored action dataset by virtue of the command template hashes being different. Similarly, the independent hash signatures for each portion of data included in an action dataset can facilitate efficient determination of changes or differences between any combination of data portions in a received action dataset and a stored action dataset.

Relevance component 350 can determine, based on commands or command representations received by a digital assistant device 210, a likelihood that a particular command template corresponds to the received command or command representation. While a variety of relevance determining methods may be employed, a machine learning implementation may be preferable, though a ranking of determined most similar command templates to a command or command representation received from a digital assistant device 210 can also facilitate a determination of relevance and therefore one or more most relevant command templates. Determined most-relevant command templates can thereby facilitate the selection of a most relevant action dataset to be distributed to the command-sending digital assistant device 210.

The distribution component 360 can distribute or communicate to one or more digital assistant devices 210, determined relevant or most relevant action datasets, determined new action datasets, determined updated action datasets, any portion and/or combination of the foregoing, or generated notifications corresponding to any portion and/or combination of the foregoing, among other things, based on a variety of factors. For instance, the distribution component 360 can include features that determine, among other things, which applications are installed on a digital assistant device 210. Such features can enable the digital assistant server 310 to determine which action datasets or portions thereof are relevant to the digital assistant device 210, and should be distributed to the digital assistant device 210. For instance, a digital assistant device 210 profile (not shown) describing all applications currently installed or executable by a digital assistant device 210, can be maintained (e.g., stored, updated) by the digital assistant server 310. The profile can be updated periodically, manually, or dynamically by a server interfacing component 260 of the digital assistant device 210 (e.g., whenever the digital assistant is in communication with and sends a command to the digital assistant server 310, or whenever an application is installed or updated on the digital assistant device 210). The distribution component 360 can distribute or communicate notifications, action datasets, or portions thereof, in a variety of ways, such as pushing, sending in response to received requests for updates, sending in response to established communications with a digital assistant device 210, or by automatic wide scale (e.g., all digital assistant devices) or selective scale (e.g., region, location, app type, app name, app version) distribution, among other things.

Figure 4:
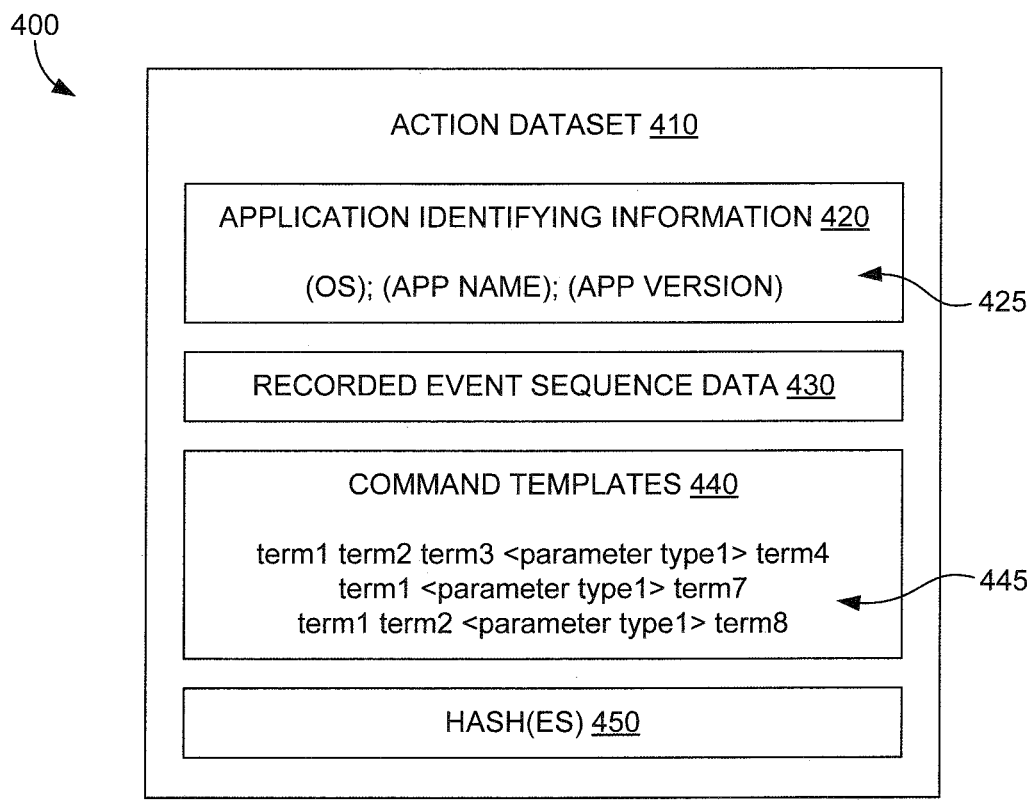
FIG. 4 is an exemplary data structure of an action dataset, in accordance with an embodiment of the present disclosure.

Turning now to FIG. 4, a data structure 4A of an exemplary action dataset 410 in accordance with some of the described embodiments is illustrated. The depicted data structure is not intended to be limiting in any way, and any configuration of the depicted data portions of information may be within the purview of the present disclosure. Further, additional data portions or less data portions may be included in an action dataset 410 also remaining within the purview of the present disclosure.

In the depicted data structure 400, the action dataset 410 includes application identifying information 420, recorded event sequence data 430, and command templates 440. In some embodiments, the action dataset 410 further includes hash(es) 450, which can include a hash value generated based on the entire action dataset 410, or hash values generated based on any portion of the aforementioned data portions 420, 430, 440, among other things. The action dataset 410 can be generated by training component 250 of digital assistant device 210 of FIG. 2 and/or received from distribution component 360 of digital assistant server 310 of FIG. 3.

The application identifying information 420 can include information about a particular application that is required for execution to perform a particular operation for which the action dataset 410 was created. Exemplary pieces of application identifying information 420 are depicted in identifying information 425, which can include any one or more of an operating system (OS) name for which the particular application is executed on, an OS version of the aforementioned OS, a defined native language of the aforementioned OS, a name of the particular application, a version of the particular application, and the like. It is contemplated that the application identifying information 420 is required and checked (e.g., by the digital assistant server 310 of FIG. 3), before an action dataset 410 is distributed to a digital assistant device (e.g., digital assistant device 210 of FIG. 2) and employed by the digital assistant device to ensure that the action dataset 410 is compatible with, or can be correctly interpreted by action executing component 240 of FIG. 2, so that the corresponding and desired operation is performed by the digital assistant device 210.

The recorded event sequence data 430 can include any or all task or event-related data that was obtained, received, or determined by the digital assistant device (e.g., via training component 250 of FIG. 2) responsible for generating the action dataset 410. As noted herein, the recorded event sequence data can include timing attributes of received inputs (e.g., delays before or in between successive inputs, duration of inputs, GUI elements interacted with, relative positions of GUI elements, labels or metadata of GUI elements, scroll inputs and distances, links or URLs accessed activated, detected activation of application deep links activated in response to received inputs, and more). In some instances, the recorded event sequence data 430 may include conditions that require actual user intervention before subsequent events or tasks are resumed. For instance, secured login screens may require that a user input username and password information before an application is executed. In this regard, the recorded event sequence data 430 may include a condition corresponding to when user authentication has occurred, and instructions (e.g., interpretable by action executing component 240) to proceed with the tasks or events in the recorded event sequence data 430 based upon an occurrence of the condition. In various implementations, it is contemplated that the action executing component 240 of FIG. 2 can parse metadata, GUI elements, or other information from an executing application to determine when certain events occur or conditions are met. In this regard, additional conditions may be included in the recorded event sequence data 430 that require prior events or tasks to be completed, or certain GUI elements be displayed or interacted with, or any other conditions to be met, before subsequent events or tasks are performed by the action executing component 240 of FIG. 2.

Figure 5:
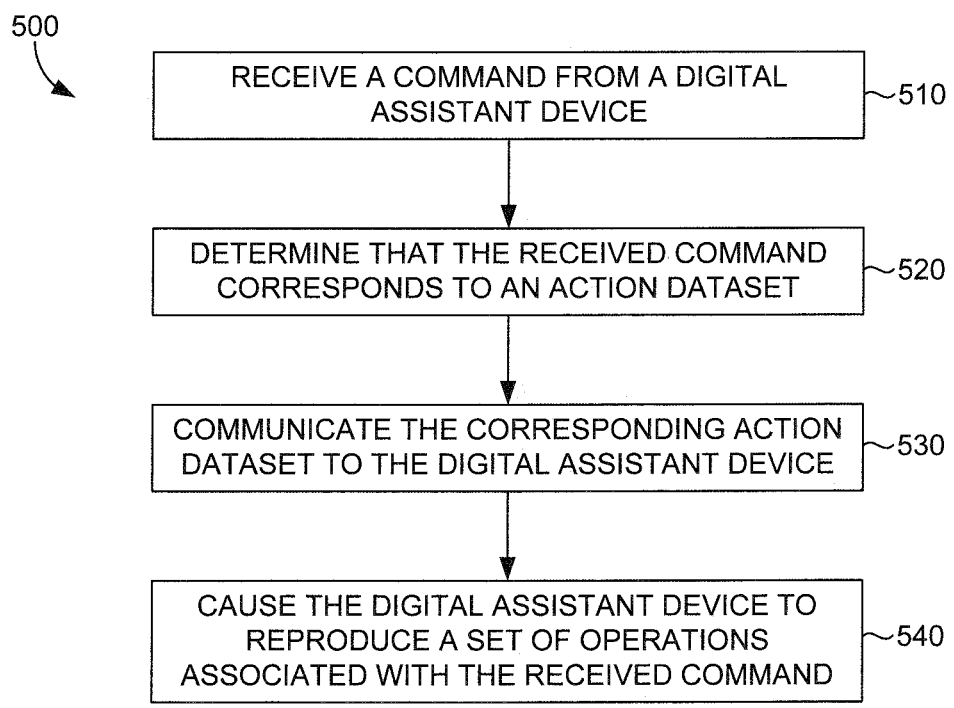
FIG. 5 is a flow diagram showing a method for distributing actionable operations in a crowd-sourced digital assistant network, according to various embodiments of the present invention.

Turning now to FIG. 5, an embodiment of a process flow or method 500 for distributing actionable operations (i.e., action datasets) for a crowd-sourced digital assistant network is described. At step 510, a server device, such as digital assistant server 310 of FIG. 3, can receive a command transmitted from a digital assistant device, such as digital assistant device 210 of FIG. 2. The command can include, among other things, an alphanumeric text representation of a spoken command that was detected by the digital assistant device. To this end, the digital assistant device can employ a speech-to-text engine or $3^{rd}$-party service to convert the detected spoken command to alphanumeric text before it is communicated to the server device.

At step 520, the server device can determine, among other things, that the received command corresponds to an action dataset that is stored by the server device. The action dataset can be one of many action datasets stored by the server device, and can be stored in a local memory or a database, such as database 140 of FIG. 1, that is in communication with the server device. A stored action dataset can be generated by any computing device, such as a remote computing device or another digital assistant device, which can generate the action dataset and communicate it to the server device for storage, indexing, and maintenance thereof. An action dataset can include, among other things, one or more command templates that includes keywords and/or parameter fields, which can be employed by the server device to determine that the received command corresponds to the action dataset. For instance, the keywords can be compared to the received command, and parameters corresponding to the parameter fields can be extracted from the received command. In some other instances, ranking and/or comparison algorithm(s), or other machine learning technologies can be employed to determine a likelihood that a command template of an action dataset corresponds to a received command. As also described herein, each action dataset can include, among other things, a set of instructions that is interpretable by a digital assistant device in accordance with the present disclosure, to reproduce a particular set of operations that can be unique to the action dataset.

At step 530, the server device can communicate the action dataset determined to correspond to the received command to the digital assistant device. In some aspects, the received command or portions thereof (e.g., extracted parameters) can also be communicated back to the digital assistant device. In this regard, when the digital assistant device receives the action dataset from the server device responsive to the command having been sent to the server device, the digital assistant device can, at step 540, reproduce the set of operations included in the received action dataset. In other words, the communication of the action dataset from the server device to the digital assistant device can cause the digital assistant device, based on its receipt of the action dataset, to reproduce the set of operations included in the action dataset. In this regard, the digital assistant device's interpretation of the included set of operations can reproduce or execute a desired result (e.g., function) that is defined by the set of operations of the action dataset.

In some aspects, the set of operations can be interpreted by the digital assistant device immediately upon receipt of the action dataset. In some other aspects, the set of operations can be interpreted after a prompt is displayed or audibly reproduced by the digital assistant device and an affirmative confirmation (e.g., selection, user input, or verbal acknowledgement) is received by the digital assistant device. As it is contemplated that in some situations, multiple action datasets may be determined by the server device to correspond to the received command, each of the determined corresponding action datasets can be communicated to the digital assistant device, such that a selection of a preferred operation can be received by the digital assistant device. In other words, the digital assistant device may present or provide for display a list of corresponding applications of each received action dataset, so that a user can provide a selection (e.g., touch input or audible input) of one of the received action datasets so that it's included set of operations can be interpreted by the digital assistant device.

Figure 6:
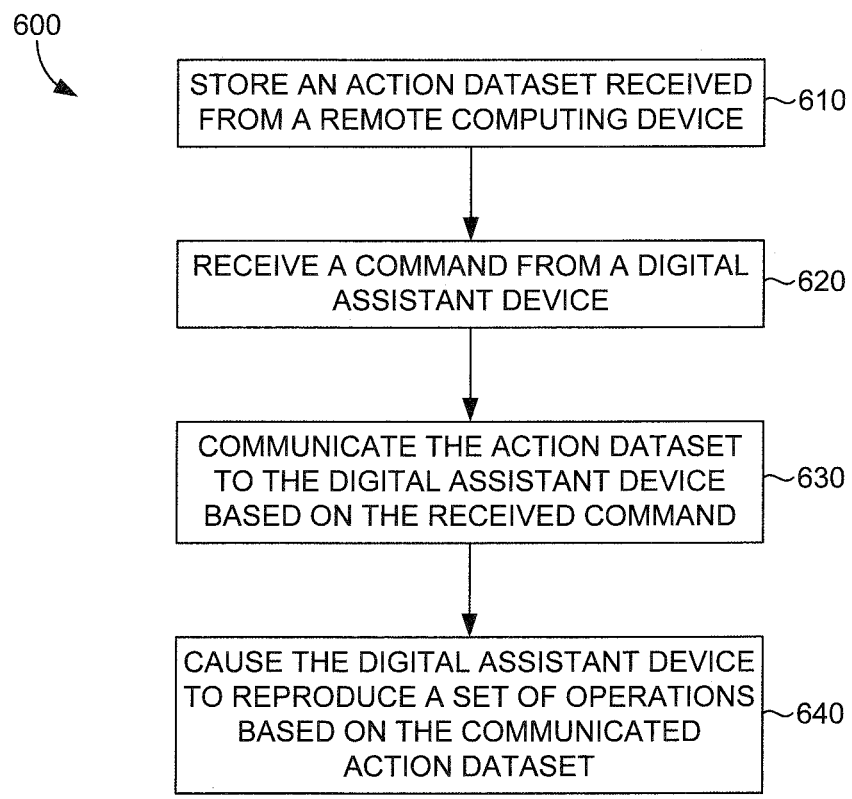
FIG. 6 is another flow diagram showing a method for distributing actionable operations in a crowd-sourced digital assistant network, according to various embodiments of the present invention.

Turning now to FIG. 6, an embodiment of a process flow or method 600 for distributing actionable operations (i.e., action datasets) for a crowd-sourced digital assistant network is described. At step 610, a server device, such as digital assistant server 310 of FIG. 3, can receive an action dataset generated by a remote computing device, such as a computing device 700 described in accordance with FIG. 7. In some aspects, the remote computing device can be any digital assistant device, such as described in accordance with digital assistant device 210 of FIG. 2. The received action dataset can include, among other things, a set of instructions that is interpretable by any digital assistant device in accordance with embodiments described herein, and may further include one or more command templates having one or mom defined keywords and/or parameter fields. In some aspects, each command template corresponds to a spoken command or a command representation that can be determined, by the server device or digital assistant device, that the spoken command or command representation corresponds to a particular (or several particular) action dataset(s).

At step 620, the server device can receive a command from a digital assistant device, such as digital assistant device 210 of FIG. 2. For purposes of this description, the digital assistant device from which the command was received can be a different digital assistant that had generated and communicated the action dataset to the server device, though the possibility that a single digital assistant device can both generate, send to the server, and receive the same action dataset is considered within the purview of the present disclosure. The command can include, among other things, an alphanumeric text representation of a spoken command that was detected by the digital assistant device. To this end, the digital assistant device can employ a speech-to-text engine or $3^{rd}$-party service to convert the detected spoken command to alphanumeric text before it is communicated to the server device.

At step 630, the server device can determine, among other things, that the received command corresponds to an action dataset that is stored by the server device. The action dataset can be one of many action datasets stored by the server device, and can be stored in a local memory or a database, such as database 140 of FIG. 1, that is in communication with the server device. An action dataset can include, among other things, one or more command templates that includes keywords and/or parameter fields, which can be employed by the server device to determine that the received command corresponds to the action dataset. For instance, the keywords can be compared to the received command, and parameters corresponding to the parameter fields can be extracted from the received command. In some other instances, ranking and/or comparison algorithm(s), or other machine learning technologies can be employed to determine a likelihood that a command template of an action dataset corresponds to a received command. As also described herein, each action dataset can include, among other things, a set of instructions that is interpretable by a digital assistant device in accordance with the present disclosure, to reproduce a particular set of operations that can be unique to the action dataset. The server device can communicate the action dataset determined to correspond to the received command to the digital assistant device. In some aspects, the received command or portions thereof (e.g., extracted parameters) can also be communicated back to the digital assistant device. In this regard, when the digital assistant device receives the action dataset from the server device responsive to the command having been sent to the server device, the digital assistant device can, at step 640, reproduce the set of operations included in the received action dataset. In other words, the communication of the action dataset from the server device to the digital assistant device can cause the digital assistant device, based on its receipt of the action dataset, to reproduce the set of operations included in the action dataset. In this regard, the digital assistant device's interpretation of the included set of operations can reproduce or execute a desired result (e.g., function) that is defined by the set of operations of the action dataset.

In some aspects, the set of operations can be interpreted by the digital assistant device immediately upon receipt of the action dataset. In some other aspects, the set of operations can be interpreted alter a prompt is displayed or audibly reproduced by the digital assistant device and an affirmative confirmation (e.g., selection, user input, or verbal acknowledgement) is received by the digital assistant device. As it is contemplated that in some situations, multiple action datasets may be determined by the server device to correspond to the received command, each of the determined corresponding action datasets can be communicated to the digital assistant device, such that a selection of a preferred operation can be received by the digital assistant device. In other words, the digital assistant device may present or provide for display a list of corresponding applications of each received action dataset, so that a user can provide a selection (e.g., touch input or audible input) of one of the received action datasets so that it's included set of operations can be interpreted by the digital assistant device.

Figure 7:
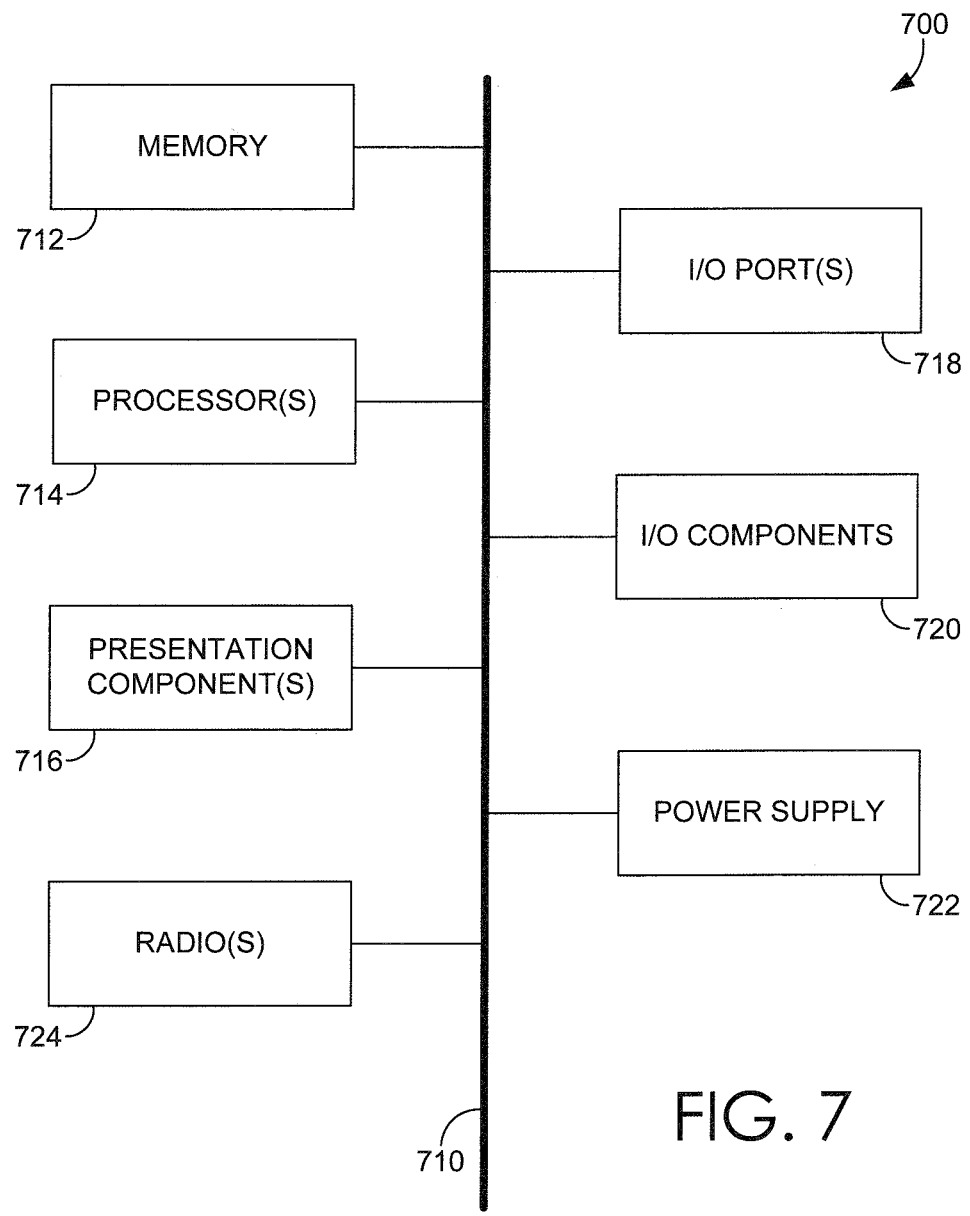
FIG. 7 is a block diagram of an exemplary computing environment suitable for use in implementing embodiments of the present invention.

Having described various embodiments of the invention, an exemplary computing environment suitable for implementing embodiments of the invention is now described. With reference to FIG. 7, an exemplary computing device is provided and referred to generally as computing device 700. The computing device 700 is but one example of a suitable computing environment and is not intended to suggest any limitation as to the scope of use or functionality of the invention. Neither should the computing device 700 be interpreted as having any dependency or requirement relating to any one or combination of components illustrated.

Embodiments of the invention may be described in the general context of computer code or machine-useable instructions, including computer-useable or computer-executable instructions, such as program modules, being executed by a computer or other machine, such as a personal data assistant, a smartphone, a tablet PC, or other handheld device. Generally, program modules, including routines, programs, objects, components, data structures, and the like, refer to code that performs particular tasks or implements particular abstract data types. Embodiments of the invention may be practiced in a variety of system configurations, including handheld devices, consumer electronics, general-purpose computers, more specialty computing devices, etc. Embodiments of the invention may also be practiced in distributed computing environments where tasks are performed by remote-processing devices that are linked through a communications network. In a distributed computing environment, program modules may be located in both local and remote computer storage media including memory storage devices.

With reference to FIG. 7, computing device 700 includes a bus 710 that directly or indirectly couples the following devices: memory 712, one or more processors 714, one or more presentation components 716, one or more input/output (110) ports 718, one or more I/O components 720, and an illustrative power supply 722. Bus 710 represents what may be one or more busses (such as an address bus, data bus, or combination thereof). Although the various blocks of FIG. 7 are shown with lines for the sake of clarity, in reality, these blocks represent logical, not necessarily actual, components. For example, one may consider a presentation component such as a display device to be an I/O component. Also, processors have memory. The inventors hereof recognize that such is the nature of the art and reiterate that the diagram of FIG. 7 is merely illustrative of an exemplary computing device that can be used in connection with one or more embodiments of the present invention. Distinction is not made between such categories as "workstation," "server," "laptop." "handheld device," etc., as all are contemplated within the scope of FIG. 7 and with reference to "computing device."

Computing device 700 typically includes a variety of computer-readable media. Computer-readable media can be any available media that can be accessed by computing device 70) and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM. EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 700. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Combinations of any of the above should also be included within the scope of computer-readable media.

Memory 712 includes computer storage media in the form of volatile and/or nonvolatile memory. The memory may be removable, non-removable, or a combination thereof. Exemplary hardware devices include solid-state memory, hard drives, optical-disc drives, etc. Computing device 700 includes one or more processors 714 that read data from various entities such as memory 712 or I/O components 720. Presentation component(s) 716 presents data indications to a user or other device. Exemplary presentation components include a display device, speaker, printing component, vibrating component, and the like.

The I/O ports 718 allow computing device 700 to be logically coupled to other devices, including I/O components 720, some of which may be built in. Illustrative components include a microphone, joystick, game pad, satellite dish, scanner, printer, wireless device, etc. The I/O components 720 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on the computing device 700. The computing device 700 may be equipped with depth cameras, such as stereoscopic camera systems, infrared camera systems, RGB camera systems, and combinations of these, for gesture detection and recognition. Additionally, the computing device 700 may be equipped with accelerometers or gyroscopes that enable detection of motion. The output of the accelerometers or gyroscopes may be provided to the display of the computing device 700 to render immersive augmented reality or virtual reality.

Some embodiments of computing device 700 may include one or more radio(s) 724 (or similar wireless communication components). The radio 724 transmits and receives radio or wireless communications. The computing device 700 may be a wireless terminal adapted to receive communications and media over various wireless networks. Computing device 700 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types of connections (i.e., a primary connection and a secondary connection). A short-range connection may include, by way of example and not limitation, a Wi-Fi® connection to a device (e.g., mobile hotspot) that provides access to a wireless communications network, such as a WLAN connection using the 802.11 protocol; a Bluetooth connection to another computing device is a second example of a short-range connection, or a near-field communication connection. A long-range connection may include a connection using, by way of example and not limitation, one or more of CDMA, GPRS, GSM, TDMA, and 802.16 protocols.

Many different arrangements of the various components depicted, as well as components not shown, are possible without departing from the scope of the claims below. Embodiments of the present invention have been described with the intent to be illustrative rather than restrictive. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

The invention claimed is:

1. A computer-implemented method, comprising:
obtaining an action dataset having a command template that corresponds to a received command,
wherein the action dataset has a set of instructions interpretable by a remote computing device to cause the remote computing device to reproduce a series of operations utilizing an application of the remote computing device;
transmitting the action dataset to the remote computing device; and
causing the remote computing device to reproduce the series of operations based at least in part on the set of instructions included in the action dataset.

2. The method of claim 1, further comprising:
receiving the command from the remote computing device; and
obtaining the action dataset based on a set of keywords associated with the command template that correspond to the command received from the remote computing device.

3. The method of claim 1, further comprising:
receiving an action dataset profile from the remote computing device; and
obtaining the action dataset based on the action dataset profile.

4. The method of claim 3, wherein the action dataset profile includes a list of instruction sets interpretable by the remote computing device.

5. A non-transitory computer storage medium storing computer-useable instructions that, when executed by one or more computing devices, cause the one or more computing devices to perform a method, the method comprising:

receiving a command from a computing device;
determining that at least two action datasets are relevant to the received command,
wherein an action dataset includes a command template and a set of instructions and is interpretable by the computing device to cause the computing device to reproduce a series of operations based on the set of instructions within the action dataset;
causing the computing device to display a listing of the at least two relevant action datasets;
receiving a selection of one action dataset of the at least two relevant action datasets; and
causing the computing device to reproduce the series of operations that corresponds to the selected one action dataset.

6. The non-transitory computer storage medium of claim 5, wherein the command template has a set of keywords, and the at least two action datasets are relevant to the received command based on a determination that each command template associated with the at least two action datasets corresponds to the received command.

7. The non-transitory computer storage medium of claim 5, further comprising:
communicating the selected one action dataset to the computing device in response to receiving the selection.

8. The non-transitory computer storage medium of claim 7, wherein each action dataset is associated with one application of the computing device.

9. The non-transitory computer storage medium of claim 7, wherein each action dataset is associated with one or more applications of the computing device, and the series of operations corresponding to the selected one action dataset is reproduced via the one or more applications.

10. A method performed by a server device, the method comprising:
receiving a command from a digital assistant device, the command corresponding to a requested set of operations to be performed by the digital assistant device;
determining that the received command corresponds to a command template of an action dataset stored by the server device,
wherein the action dataset includes the command template and a set of instructions and is interpretable by the digital assistant device to reproduce the series of operations utilizing an application of the digital assistant device; and
communicating to the digital assistant device the action dataset determined to correspond to the received command.

11. The method of claim 10, further comprising:
causing a reproduction of the set of operations on the digital assistant device based at least in part on the communication of the action dataset to the digital assistant device.

12. The method of claim 10, wherein the action dataset is generated by a second digital assistant device and indexed by the server device for use by digital assistant devices.

13. The method of claim 10, wherein the command includes an alphanumeric text representation of a spoken command.

14. The method of claim 13, wherein alphanumeric text representation is generated by the digital assistant device based on a received audible command.

15. The method of claim 10, wherein the command is determined to correspond to the action dataset based at least in part on a determination that one or more keywords of the command template of the action dataset correspond to the received command.

16. The method of claim 15, wherein the command template of the action dataset includes at least one keyword and at least one defined parameter field.

17. The method of claim 10, wherein the action dataset corresponds to at least one application installed on the digital assistant device.

* * * * *